United States Patent [19]

Sasson

[11] Patent Number: 5,124,692
[45] Date of Patent: Jun. 23, 1992

[54] METHOD AND APPARATUS FOR PROVIDING ROTATION OF DIGITAL IMAGE DATA

[75] Inventor: Steven J. Sasson, Hilton, N.Y.

[73] Assignee: Eastman Kodak Company, Rochester, N.Y.

[21] Appl. No.: 508,620

[22] Filed: Apr. 13, 1990

[51] Int. Cl.[5] .......................... H04N 9/74; H04N 9/14
[52] U.S. Cl. .................................... 340/727; 340/724; 358/22; 358/160
[58] Field of Search ................... 340/727, 724; 358/22, 358/160; 400/121

[56] References Cited

U.S. PATENT DOCUMENTS

| | | |
|---|---|---|
| 3,803,445 | 4/1974 | Wagner . |
| 4,011,401 | 3/1977 | Presti . |
| 4,163,249 | 7/1979 | Michael et al. . |
| 4,302,776 | 11/1981 | Taylor et al. . |
| 4,554,638 | 11/1985 | Iida ..................................... 340/727 |
| 4,567,570 | 1/1986 | Peer ..................................... 400/121 |
| 4,636,783 | 1/1987 | Omachi . |
| 4,806,920 | 2/1989 | Sawada ............................... 340/727 |
| 4,837,845 | 6/1989 | Pruett et al. . |
| 4,929,085 | 5/1990 | Kajihara ................................ 382/46 |
| 5,012,434 | 4/1991 | Zietlow et al. ...................... 340/727 |

Primary Examiner—Alvin E. Oberley
Assistant Examiner—Amare Mengistu
Attorney, Agent, or Firm—Parkhurst, Wendel & Rossi

[57] ABSTRACT

The invention provides a framestore architecture that permits direct addressing of digital image data in order to generate rotated image. The framestore architecture permits direct addressing at standard video sampling rates in order to generate rotated image data in real time. More specifically, in a preferred embodiment, the present invention provides an input unit for latching input pixel data in a predetermined sequence; a storage unit, including a plurality of storage devices, coupled to the input unit for storing the input pixel data latched by the input unit; an output unit coupled to the storage unit for retrieving the pixel data stored in the storage unit and generating an output pixel data stream in accordance with a predetermined sequence; an addressing unit coupled to the storage unit for addressing the storage devices included therein; and a control unit for controlling the overall operation of the input unit, the storage unit, the output unit and the addressing unit in a write operation mode and a read operation mode, wherein the input pixel data is stored in the storage devices in the write operation mode such that consecutive pixel data retrieved during the read operation mode is not stored in the same storage device.

5 Claims, 6 Drawing Sheets

| 0-0 | 0'-0 | 1-0 | 1'-0 | 2-0 | 2'-0 | 3-0 | 3'-0 |
|---|---|---|---|---|---|---|---|
| 0-1 | 0'-1 | 1-1 | 1'-1 | 2-1 | 2'-1 | 3-1 | 3'-1 |
| 0-2 | 0'-2 | 1-2 | 1'-2 | 2-2 | 2'-2 | 3-2 | 3'-2 |
| 0-3 | 0'-3 | 1-3 | 1'-3 | 2-3 | 2'-3 | 3-3 | 3'-3 |
| 0-4 | 0'-4 | 1-4 | 1'-4 | 2-4 | 2'-4 | 3-4 | 3'-4 |
| 0-5 | 0'-5 | 1-5 | 1'-5 | 2-5 | 2'-5 | 3-5 | 3'-5 |
| 0-6 | 0'-6 | 1-6 | 1'-6 | 2-6 | 2'-6 | 3-6 | 3'-6 |
| 0-7 | 0'-7 | 1-7 | 1'-7 | 2-7 | 2'-7 | 3-7 | 3'-7 |
| 0-8 | 0'-8 | 1-8 | 1'-8 | 2-8 | 2'-8 | 3-8 | 3'-8 |
| 0-9 | 0'-9 | 1-9 | 1'-9 | 2-9 | 2'-9 | 3-9 | 3'-9 |
| 0-10 | 0'-10 | 1-10 | 1'-10 | 2-10 | 2'-10 | 3-10 | 3'-10 |
| 0-11 | 0'-11 | 1-11 | 1'-11 | 2-11 | 2'-11 | 3-11 | 3'-11 |

FIG. 1

| 3'-0 | 3-0 | 2'-0 | 2-0 | 1'-0 | 1-0 | 0'-0 | 0-0 |
|---|---|---|---|---|---|---|---|
| 3'-1 | 3-1 | 2'-1 | 2-1 | 1'-1 | 1-1 | 0'-1 | 0-1 |
| 3'-2 | 3-2 | 2'-2 | 2-2 | 1'-2 | 1-2 | 0'-2 | 0-2 |
| 3'-3 | 3-3 | 2'-3 | 2-3 | 1'-3 | 1-3 | 0'-3 | 0-3 |
| 3'-4 | 3-4 | 2'-4 | 2-4 | 1'-4 | 1-4 | 0'-4 | 0-4 |
| 3'-5 | 3-5 | 2'-5 | 2-5 | 1'-5 | 1-5 | 0'-5 | 0-5 |
| 3'-6 | 3-6 | 2'-6 | 2-6 | 1'-6 | 1-6 | 0'-6 | 0-6 |
| 3'-7 | 3-7 | 2'-7 | 2-7 | 1'-7 | 1-7 | 0'-7 | 0-7 |
| 3'-8 | 3-8 | 2'-8 | 2-8 | 1'-8 | 1-8 | 0'-8 | 0-8 |
| 3'-9 | 3-9 | 2'-9 | 2-9 | 1'-9 | 1-9 | 0'-9 | 0-9 |
| 3'-10 | 3-10 | 2'-10 | 2-10 | 1'-10 | 1-10 | 0'-10 | 0-10 |
| 3'-11 | 3-11 | 2'-11 | 2-11 | 1'-11 | 1-11 | 0'-11 | 0-11 |

| LINE | ORIGINAL PIX | ROTATED PIX | BANK 1 | BANK 2 | BANK 3 | CHIP |
|------|--------------|-------------|--------|--------|--------|------|
| 0 | 3-0 | 0-0 | X | X-2(256) | | 1B |
|   | 3-0 | 0-1 |   | X-2(256) | X-256 | 1A |
|   | 2-0 | 0-2 |   |          |       | 3B |
|   | 2-0 | 0-3 |   |          |       | 3A |
|   | 1-0 | 0-4 |   |          |       | 2B |
|   | 1-0 | 0-5 |   |          |       | 2A |
|   | 0-0 | 0-6 | X-3(256) | X-5(256) | X-4(256) | 1B |
|   | 0-0 | 0-7 | X-2(256) | X-256 |         | 1A |
| 1 | 3-2 | 1-0 |   |       | X    | 3B |
|   | 3-2 | 1-1 |   |       |      | 3A |
|   | 2-2 | 1-2 |   |       |      | 2B |
|   | 2-2 | 1-3 |   |       |      | 2A |
|   | 1-2 | 1-4 |   |       |      | 1B |
|   | 1-2 | 1-5 |   |       |      | 1A |
|   | 0-2 | 1-6 | X-5(256) | X-4(256) | X-3(256) | 3B |
|   | 0-2 | 1-7 | X+1-(256) | X+1 | X+1-2(256) | 3A |
| 2 | 3-4 | 2-0 |   |       |      | 2B |
|   | 3-4 | 2-1 |   |       |      | 2A |
|   | 2-4 | 2-2 |   |       |      | 1B |
|   | 2-4 | 2-3 |   |       |      | 1A |
|   | 1-4 | 2-4 |   |       |      | 3B |
|   | 1-4 | 2-5 |   |       |      | 3A |
|   | 0-4 | 2-6 | X+1-4(256) | X+1-3(256) | X+1-5(256) | 2B |
|   | 0-4 | 2-7 |            | X+2-2(256) | X+2-(256)  | 2A |
| 3 | 3-6 | 3-0 | X+2 | X+2-2(256) |  | 1B |
|   | 3-6 | 3-1 |     |            |  | 1A |
|   | 2-6 | 3-2 |     |            |  | 3B |
|   | 2-6 | 3-3 |     |            |  | 3A |

| LINE | ORIGINAL PIX | ROTATED PIX | BANK 1 | BANK 2 | BANK 3 | CHIP |
|------|--------------|-------------|--------|--------|--------|------|
| 0' | 3'-1 | 0'-0 | X-256 | X | X-2(256) | 2B |
|    | 3'-1 | 0'-1 |       |   |          | 2A |
|    | 2'-1 | 0'-2 |       |   |          | 1B |
|    | 2'-1 | 0'-3 |       |   |          | 1A |
|    | 1'-1 | 0'-4 |       |   |          | 3B |
|    | 1'-1 | 0'-5 |       |   |          | 3A |
|    | 0'-1 | 0'-6 | X-4(256) | X-3(256) | X-5(256) | 2B |
|    | 0'-1 | 0'-7 |          |          |          | 2A |
| 1' | 3'-3 | 1'-0 | X+1 | X+1-2(256) | X+1-(256) | 1B |
|    | 3'-3 | 1'-1 |     |            |           | 1A |
|    | 2'-3 | 1'-2 |     |            |           | 3B |
|    | 2'-3 | 1'-3 |     |            |           | 3A |
|    | 1'-3 | 1'-4 |     |            |           | 2B |
|    | 1'-3 | 1'-5 |     |            |           | 2A |
|    | 0'-3 | 1'-6 | X+1-3(256) | X+1-5(256) | X+1-4(256) | 1B |
|    | 0'-3 | 1'-7 |            |            |            | 1A |
| 2' | 3'-5 | 2'-0 | X+1-2(256) | X+1-(256) | X+1 | 3B |
|    | 3'-5 | 2'-1 |            |           |     | 3A |
|    | 2'-5 | 2'-2 |            |           |     | 2B |
|    | 2'-5 | 2'-3 |            |           |     | 2A |
|    | 1'-5 | 2'-4 |            |           |     | 1B |
|    | 1'-5 | 2'-5 |            |           |     | 1A |
|    | 0'-5 | 2'-6 | X+1-5(256) | X+1-4(256) | X+1-3(256) | 3B |
|    | 0'-5 | 2'-7 |            |           |            | 3A |
| 3' | 3'-7 | 3'-0 | X-2-(256) | X+2 | X+2-2(256) | 2B |
|    | 3'-7 | 3'-1 |           |     |            | 2A |
|    | 2'-7 | 3'-2 |           |     |            | 1B |
|    | 2'-7 | 3'-3 |           |     |            | 1A |

| LINE | ORIGINAL PIX | ROTATED PIX | BANK 1 | BANK 2 | BANK 3 | CHIP | | LINE | ORIGINAL PIX | ROTATED PIX | BANK 1 | BANK 2 | BANK 3 | CHIP |
|---|---|---|---|---|---|---|---|---|---|---|---|---|---|---|
| 0 | 0-11 | 0-0 | X+256 | X+2(256) | X | 3A | | 0 | 0-10 | 0'-0 | X+2(256) | X | X+256 | 2A |
|  | 0'-11 | 0'-0 |  |  |  | 3B |  |  | 0'-10 | 0'-1 |  |  |  | 2B |
|  | 1-11 | 0-1 |  |  |  | 1A |  |  | 1-10 | 0'-2 |  |  |  | 3A |
|  | 1'-11 | 0'-1 |  |  |  | 1B |  |  | 1'-10 | 0'-3 |  |  |  | 3B |
|  | 2-11 | 0-2 |  |  |  | 2A |  |  | 2-10 | 0'-4 |  |  |  | 1A |
|  | 2'-11 | 0'-2 |  |  |  | 2B |  |  | 2'-10 | 0'-5 |  |  |  | 1B |
|  | 3-11 | 0-3 | X+4(256) | X+5(256) | X+3(256) | 3A |  |  | 3-10 | 0'-6 | X+5(256) | X+3(256) | X+4(256) | 2A |
|  | 3'-11 | 0'-3 |  |  |  | 3B |  |  | 3'-10 | 0'-7 |  |  |  | 2B |
| 1 | 0-9 | 1-0 | X | X+256 | X+2(256) | 1A | | 1 | 0-8 | 1'-0 | X-1+(256) | X-1 | X-1 | 3A |
|  | 0'-9 | 1'-0 |  |  |  | 1B |  |  | 0'-8 | 1'-1 |  |  |  | 3B |
|  | 1-9 | 1-1 |  |  |  | 2A |  |  | 1-8 | 1'-2 |  |  |  | 1A |
|  | 1'-9 | 1'-1 |  |  |  | 2B |  |  | 1'-8 | 1'-3 |  |  |  | 1B |
|  | 2-9 | 1-2 |  |  |  | 3A |  |  | 2-8 | 1'-4 |  |  |  | 2A |
|  | 2'-9 | 1'-2 |  |  |  | 3B |  |  | 2'-8 | 1'-5 |  |  |  | 2B |
|  | 3-9 | 1-3 | X+3(256) | X+4(256) | X+5(256) | 1A |  |  | 3-8 | 1'-6 | X-1+4(256) | X-1+5(256) | X-1+3(256) | 3A |
|  | 3'-9 | 1'-3 |  |  |  | 1B |  |  | 3'-8 | 1'-7 |  |  |  | 3B |
| 2 | 0-7 | 2-0 | X-1+(256) | X-1 | X-1+2(256) | 2A | | 2 | 0-6 | 2'-0 | X-1 | X-1+256 | X-1+2(256) | 1A |
|  | 0'-7 | 2'-0 |  |  |  | 2B |  |  | 0'-6 | 2'-1 |  |  |  | 1B |
|  | 1-7 | 2-1 |  |  |  | 3A |  |  | 1-6 | 2'-2 |  |  |  | 2A |
|  | 1'-7 | 2'-1 |  |  |  | 3B |  |  | 1'-6 | 2'-3 |  |  |  | 2B |
|  | 2-7 | 2-2 |  |  |  | 1A |  |  | 2-6 | 2'-4 |  |  |  | 3A |
|  | 2'-7 | 2'-2 |  |  |  | 1B |  |  | 2'-6 | 2'-5 |  |  |  | 3B |
|  | 3-7 | 2-3 | X-1+4(256) | X-1+3(256) | X-1+5(256) | 2A |  |  | 3-6 | 2'-6 | X-1+3(256) | X-1+4(256) | X-1+5(256) | 1A |
|  | 3'-7 | 2'-3 |  |  |  | 2B |  |  | 3'-6 | 2'-7 |  |  |  | 1B |
| 3 | 0-5 | 3-0 | X-2+(256) | X-2+2(256) | X-2 | 3A | | 3 | 0-4 | 3'-0 | X-2+2(256) | X-2 | X-2+(256) | 2A |
|  | 0'-5 | 3'-0 |  |  |  | 3B |  |  | 0'-4 | 3'-1 |  |  |  | 2B |
|  | 1-5 | 3-2 |  |  |  | 1A |  |  | 1-4 | 3'-2 |  |  |  | 3A |
|  | 1'-5 | 3'-3 |  |  |  | 1B |  |  | 1'-4 | 3'-3 |  |  |  | 3B |

FIG. 6

METHOD AND APPARATUS FOR PROVIDING ROTATION OF DIGITAL IMAGE DATA

BACKGROUND OF THE INVENTION

The present invention is directed to a method and apparatus for rotating digital images. In particular, the present invention is directed to a digital framestore architecture in which digital image information is stored in a first orientation and retrieved in a second orientation.

Digital imaging technology, including still and motion video cameras, document scanners and digital printers, provides the unique opportunity of being able to manipulate and enhance a digitally generated image to reproduce the image in any desired format. For example, the digital image data can be manipulated so that portions of the originally image are cropped—i.e. blocked from being reproduced—from the reproduced image, the size of the reproduced image can be altered, or the reproduced image can be rotated from the orientation of the original image. In addition, image enhancement techniques can be employed to improve the overall aesthetics of the reproduced image.

Image rotation is particularly useful when attempting to display images captured with a still video camera on a video monitor. Many times the operator of the camera will rotate the camera from the normal viewing position, usually either a positive 90 degrees or a negative 90 degrees, in order to record an image that cannot be properly framed in the normal viewing position. In such a case, the recorded image must be rotated before it is displayed on a video monitor, as a normal reproduction of the recorded image will result in the reproduced image being rotated 90 degrees with respect to the normal viewing position of the monitor.

Different methods of rotating a digital image have been proposed. Many utilize techniques that store image data in a memory or framestore, read the stored image data, and manipulate the data to represent a rotated image. U.S. Pat. No. 4,837,845 issued to Pruett et al. on Jun. 6, 1989, for example, discloses a method of transposing image data to accomplish image rotation and also notes a number of different references which discuss image rotation. The method disclosed in this patent, however, is accomplished through software routines and requires processing time to accomplish the rotation function. Image rotation utilizing hardware devices have also been proposed as shown in U.S. Pat. No. 4,636,783 issued to Omachi on Jan. 13, 1987, which utilizes shift-registers to accomplish the rotation function.

One of the primary disadvantages of many conventional rotation techniques that read image data from a framestore and then manipulate the data is the inability to operate in real time at the required pixel rates. For example, the international sampling rate standard (CCIR) is 13.5 MHz, which equates to 74 nsec/pixel, does not provide sufficient time to practically perform the image data manipulation in real time using either hardware or software techniques. Thus, it would be desirable to provide a direct addressing scheme that would read the image data from the framestore in the order required to generate a rotated image.

Conventional framestore devices, while capable of direct addressing in real time for normally oriented images, are not capable of providing direct addressing to provide rotated image data in real time. The primary problem with conventional framestores, as will be discussed in greater detail below, is that the addressing of the memory devices in the framestore for retrieval of rotated image data requires a single memory device to be addressed more than once during a single read cycle which, of course, cannot be accomplished. Accordingly, it is an object of the present invention to provide a framestore architecture that permits direct addressing of digital image data in order to generate rotated image data without requiring multiple addressing of a memory device within a single read cycle. It is a further object of the invention to provide a framestore architecture that provides direct addressing at standard video sampling rates.

SUMMARY OF THE INVENTION

The invention provides a framestore architecture that permits direct addressing of digital image data in order to generate rotated image. The framestore architecture permits direct addressing at standard video sampling rates in order to generate rotated image data in real time.

More specifically, in a preferred embodiment, the present invention provides and input unit for latching input pixel data in a predetermined sequence; a storage unit, including a plurality of storage devices, coupled to the input unit for storing the input pixel data latched by the input unit; an output unit coupled to the storage unit for retrieving the pixel data stored in the storage unit and generating an output pixel data stream in accordance with a predetermined sequence; an addressing unit coupled to the storage unit for addressing the storage devices included therein; and a control unit for controlling the overall operation of the input unit, the storage unit, the output unit and the addressing unit in a write operation mode and a read operation mode, wherein the input pixel data is stored in the storage devices in the write operation mode such that consecutive pixel data retrieved during the read operation mode is not stored in the same storage device.

BRIEF DESCRIPTION OF THE DRAWINGS

With the above as background, reference should now be made to the following detailed description of the preferred embodiment along with the accompanying figures in which:

FIG. 1 illustrates a normally oriented digital image;

FIG. 2 illustrates a positive 90 degree rotation of the digital image illustrated in FIG. 1;

FIG. 5 illustrates a positive 90 degree addressing scheme for the framestore illustrated in FIG. 4; and FIG. 6 illustrates a negative 90 degree addressing scheme for the framestore illustrated in FIG. 4.

DETAILED DESCRIPTION OF THE PREFERRED EMBODIMENT

The basic theory of the invention will be illustrated with reference to an example of a digital image having eight lines with twelve pixels per line as illustrated in FIG. 1. It will be understood, however, that the invention is applicable to established video standards such as NTSC and PAL and is not limited to the specifically disclosed embodiments or examples. The eight rows of the digital image are divided into two fields, with the first field containing rows 0, 1, 2 and 3 and the second field containing rows 0', 1', 2' and 3'. The notation illustrated in FIG. 1 denotes each pixel location of the digital image (for example 2-8 indicates row 2, pixel 8). FIG. 1 illustrates a normal viewing position of the digital image. The rows of pixels are sequentially supplied field by field to a monitor for normal display.

FIG. 2 illustrates a positive 90 degree rotation of the digital image illustrated in FIG. 1, i.e. the digital image of FIG. 1 is turned clockwise 90 degrees, as viewed from the normal viewing position. Pixel 0-0 has been rotated from the upper left-hand corner of the image to the upper righthand corner of the image. Pixel 3'-0 has been rotated from the lower left-hand corner of the image to the upper left-hand corner of the image. Thus, the pixels must be supplied to the monitor in the order of 3'-0, 3-0, 2'-0, 2-0, etc., if the rotated image is to be displayed on the monitor in a normal viewing position without requiring the scanning operation of the monitor to be modified. The first field in the rotated image consists of all even numbered pixels of the original image. The second field in the rotated image consists of all the odd numbered pixels of the original image.

Figure 3:
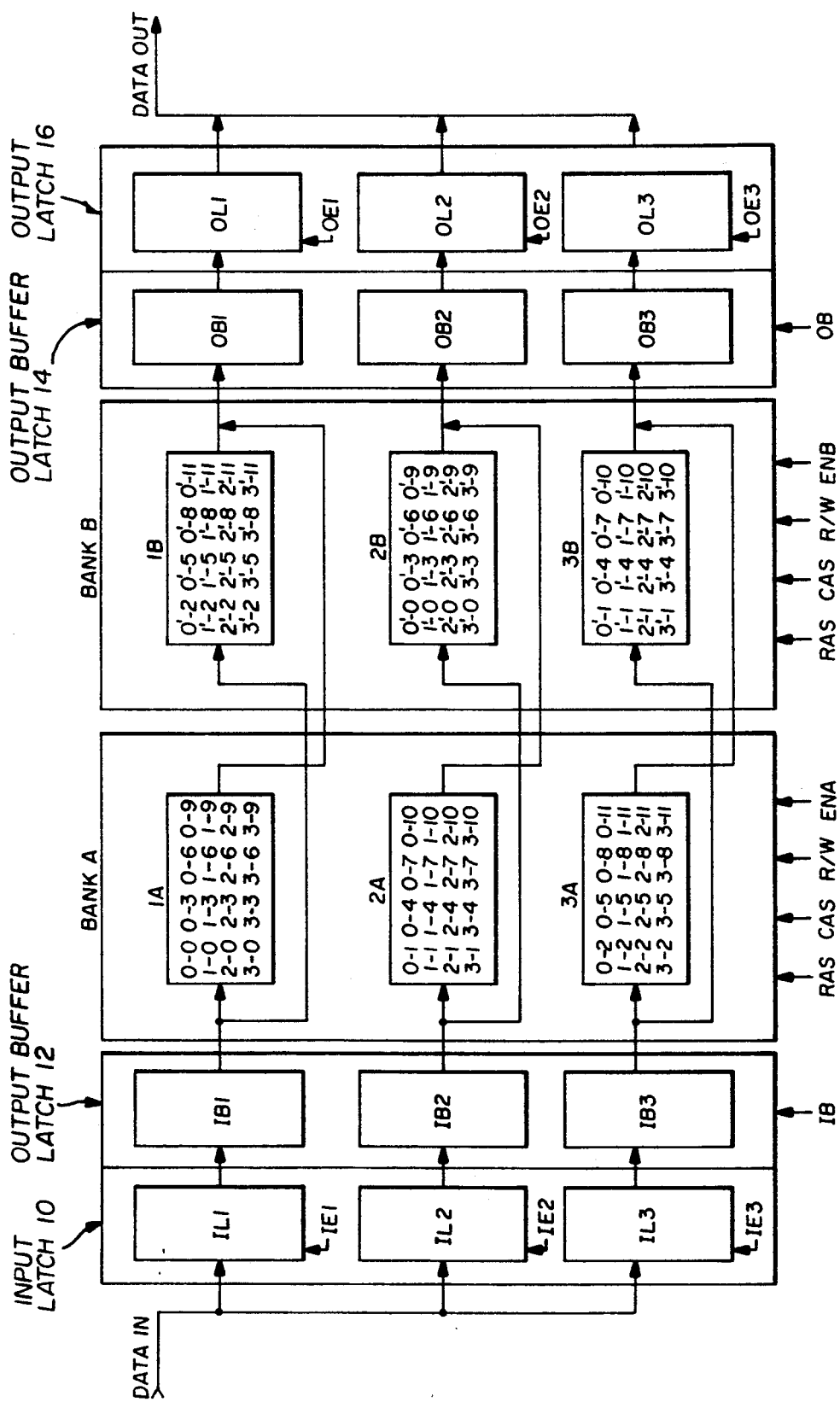
FIG. 3 illustrates a conventional framestore structure.

A conventional framestore for storing the image data representative of each pixel is illustrated in FIG. 3. The framestore includes two memory banks (Bank A, Bank B) with each memory bank having three memory devices (1A-3A, 1B-3B). Memory bank A stores the pixel data representative of the first field of the digital image and memory bank B stores pixel data representative of the second field of the digital image. Common row address select (RAS), column address select line (CAS), address lines (ADD), and read/write enable (R/W) lines are coupled to each of the memory devices within memory banks A and B. Common bank enable lines (ENA, ENB) are respectively coupled to each of the memory devices within memory banks A and B. An input latch unit 10 is provided to latch incoming pixel data. The input latch unit 10 includes a number of individual latches IL1-IL3 which correspond to the number of memory devices within the memory banks. Each of the individual latches IL1-IL3 is coupled to a corresponding input latch enable line IE1-IE3. The output of the input latch unit 10 is provided to an input buffer-latch unit 12 that includes individual input buffer-latches IB1-IB3 that correspond to the latches IL1-IL3. A single buffer latch enable line IB is supplied to each of the buffer-latches IB1-IB3. The outputs of the input buffer-latches IB1-IB3 are coupled to corresponding memory devices in each of the memory banks. The memory devices are also coupled to corresponding output buffer-latches OB1-OB3 contained within an output latch unit 14, which in turn are connected to corresponding output latches OL1-OL3 contained within an output latch unit 16. The output buffer-latches OB1-OB3 are connected to a common output buffer enable line OB and the output latches OL1-OL3 are connected to corresponding output latch enable lines OE1-OE3. A memory control unit (not shown) is used to generate the addresses and control signals supplied to the memory banks, input latch unit, input buffer-latch unit, output latch unit and output buffer-latch unit.

In operation, the input latches IL1-IL3 are sequentially enabled to latch incoming pixel data, for example, the pixel data corresponding to the first three pixels 0-0, 0-1 and 0-2 of the digital image illustrated in FIG. 1. The IB line is then activated to initiate a parallel transfer of data from the input latch unit 10 to the input buffer-latch unit 12. The input latch unit 10 continues to latch the pixel data corresponding to the next three pixels. Memory bank A is enabled to write the pixel data contained in the input buffer-latch unit 12 to the memory devices 1A, 2A and 3A. Assuming interlaced image data is being supplied to the framestore, the above sequence of operation continues until all of the pixel data for the first image line (0) is read into memory bank A, and then memory bank B is then enabled so that the next image line (0') is stored in memory devices 1B, 2B and 3B. The switching between memory banks continues until all of the pixel data is stored.

Pixel data is retrieved from the framestore in a similar manner. A parallel transfer operation is performed between the memory devices and the output buffer-latch unit 14. The data in the output buffer-latch unit 14 is then transferred in parallel to the output latch unit 16. The output latch enable lines OE1-OE3 are then sequentially enabled to output the pixel data from the output latch unit 16.

The memory devices are addressed to sequentially fill each row of memory locations within the memory devices with pixel data. For example, the first pixel stored in a given memory device is loaded in the first row, first column position, the second pixel stored in a given memory device is loaded in the first row, second column, etc., until all of the memory locations within the memory devices are filled with pixel data. The pixel data is retrieved from the framestore using the same addressing scheme.

The structure of the framestore illustrated in FIG. 3 is commonly referred to as a double buffered framestore architecture. Double buffering permits the storage and retrieval of the pixel data at standard video rates when the memory devices employed in the memory banks have a memory access time slower than the pixel data rate. For example, a write operation to a memory device can take up to three times the incoming pixel rate, as the input latch unit 10 must be sequentially filled before another parallel transfer of data to the input buffer-latch unit 12 can be performed. Thus, if the pixel rate is 74 nsec/pixel, the memory devices only require a memory write cycle time of 222 nsec. Similarly, a read operation can also take up to three times the pixel data rate as a parallel transfer of pixel data from the output buffer-latch unit 14 to the output latch unit 16 cannot occur until the output latches OL1-OL3 have been sequentially emptied of pixel data.

The framestore illustrated in FIG. 3 is capable of storing and retrieving pixel data at standard video rates when the image is maintained in its normal viewing position. Double buffering will not work, however, when the pixel data must be read out to generate a rotated image as illustrated in FIG. 2. As mentioned above, the pixel data for the rotated image must be supplied in the sequence 3'-0, 3-0, 2'-0, 2-0, etc., which cannot be accomplished with the framestore illustrated in FIG. 3. The sequence for reading the pixel data in a rotated configuration would require multiple addressing of a single memory device within a single read cycle. For example, memory device 2B would have to produce two pixels (3'-0, 2'-0) during one 222 nsec read cycle which cannot be accomplished.

Figure 4:
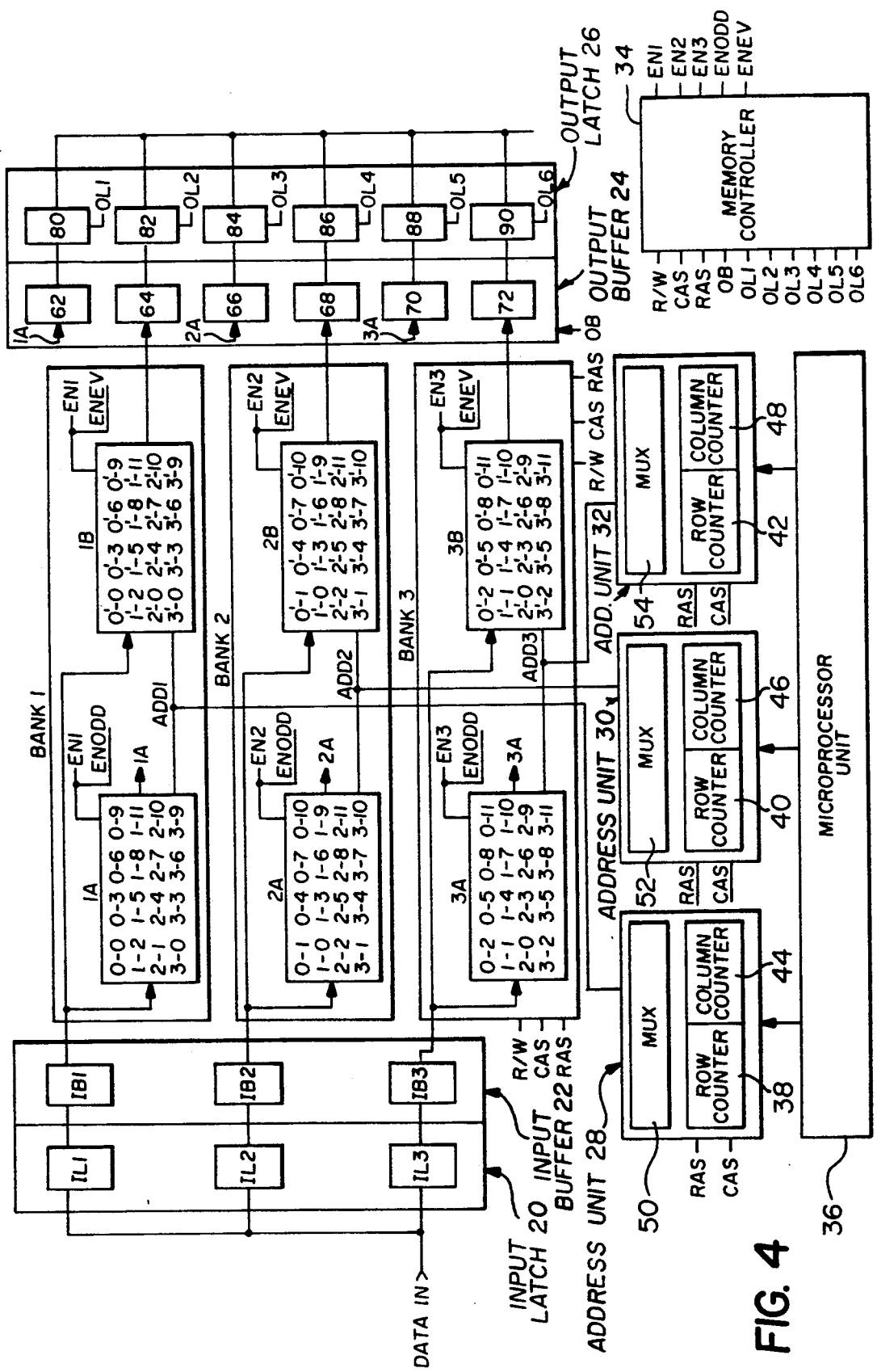
FIG. 4 illustrates a framestore architecture in accordance with the present invention.

Referring now to FIG. 4, a framestore in accordance with the present invention is shown that overcomes the problem of multiple addressing. The framestore includes an input latch unit 20, an input buffer-latch unit 22, memory banks 1, 2 and 3, an output buffer-latch unit 24, an output latch unit 26, addressing units 28-32, and a memory controller 34. A microprocessor unit 36 is coupled to the addressing units 28-32 and provides starting row and column addresses to row address counters 38-42 and column address counters 44-48 contained within the addressing units 28-32. The outputs from the row address counters 38-42 and the column address counters 44-48 are coupled to multiplexing units (MUX) 50-54 also contained within the addressing units 28-32. The multiplexing units 50-54 selectively apply the outputs of the row address counters 38-42 and the column address counters 44-48 to the respective address lines (ADD1, ADD2, ADD3) of memory banks 1, 2 and 3. Each memory bank contains two memory devices in the illustrated example, with the enable line of each memory device within a given memory bank being coupled to a corresponding bank enable line (EN1, EN2, EN3). The enable line of the first memory device within each memory bank (1A, 2A, 3A) is also coupled to an odd field enable line (ENODD) and the enable line of the second memory device within each memory bank (1B,2B,3B) is also coupled to an even field enable line (ENEV). The input latch unit 20 and the input buffer-latch unit 22 are equivalent to the input latch unit 10 and the input buffer-latch unit 12 illustrated in FIG. 3. The output buffer unit 24 contains a plurality of output buffer-latches 62-72 that correspond to the memory devices contained within the memory banks. The output buffer-latches 62-72 are coupled to corresponding output latches 80-90 contained within the output latch unit 26. Each of the output buffer-latches 62-72 are coupled to a common output buffer enable line OB, while each of the output latches 80-90 are coupled to corresponding output latch enable lines OL1-OL6. The memory controller 34 generates the various control signals (RAS, CAS, R/W, EN1, etc.) supplied to the input latch 20, the input buffer-latch unit 22, memory banks 1, 2 and 3, output buffer-latch unit 24, output latch unit 26 and addressing units 28-32.

FIG. 4 also illustrates how the pixel data for the image illustrated in FIG. 1 is stored in operation to prevent the occurrence of multiple addressing when reading the pixel data to provide a rotated image. The pixel data for the first field is stored in the first memory devices (1A, 2A, 3A) of each memory bank, while the pixel data for the second field is stored in the second memory devices (1B, 2B, 3B) of each memory bank. In each case, the first line of pixel data for each field is stored in the memory devices in the same manner as illustrated in FIG. 3. For example, the pixel data for image line 0 is stored starting with the first row and first column of memory device 1A and sequentially progressing through memory devices 2A and 3A. The second line of pixel data for each field, however, is stored such that the first pixel for the second line is stored in a different memory device than the first pixel for the first line of the field. For example, the first pixel of line 1 (1-0) is stored in memory device 2A, the second pixel (1-1) is stored in memory device 3A and the third pixel (1-2) is stored in memory device 1A. The first pixel of the third line of pixel data for each field is also stored in a memory device that does not contain the first pixel of the first and second lines of the field. For example, the first pixel (2-0) of video line 2 is stored is stored in memory device 3A, the second pixel (2-1) is stored in memory device 1A and the third pixel (2-2) is stored in memory device 2A.

In effect, a sequence is established in which the storage of pixel data for each line starts in the memory device that succeeds the memory device in which the first pixel data for a preceding line was stored, starting with the first memory device in the memory bank and proceeding to the last memory device of the memory bank and then wrapping around back to the first memory device. The sequence is obtained by changing the order in which the input latches are enabled to latch the incoming pixel data. In the case of the framestore illustrated in FIG. 3, the input latches are sequentially enabled for each line of image data in the framestore illustrated in FIG. 3 (namely, line 0: IE1, IE2, IE3; line 1: IE1, IE2, IE3; etc), with the first input latch always being the starting latch. The input latches are also sequentially enabled for each line of image data in the framestore illustrated in FIG. 4, but the starting latch is incremented for each line (line 0: IE1, IE2, IE3; line 1: IE2, IE3, IE1; line 2: IE3, IE1, IE2; line 3: IE1, IE2, IE3; etc.).

The memory devices are sequentially addressed during the writing of pixel data as in the framestore illustrated in FIG. 4 by the addressing units 28-32. A start address is loaded into each of the row and column address counters by the microprocessor unit 36. The column address counters 44-48 are incremented by the memory controller 34 each time data for a pixel is stored in the memory devices. The row address counter is incremented when an entire image line of pixel data has been stored in the memory devices. The multiplexer units are switched in accordance with the RAS and CAS signals generated by the memory controller 34 to supply the row and column addresses to the memory devices. The bank enable lines ENODD and ENEV are activated by the memory controller 34 during the write operation such that all odd field pixel data is stored in the first memory devices (1A, 2A, 3A) of memory banks 1, 2 and 3, and all odd field pixel data is stored in the second memory devices (1B, 2B, 3B) of memory banks 1, 2 and 3.

The above-described write operation insures that data for consecutive pixels during a read operation will not be required from the same memory device. For example, the sequence of accessing the memory devices in the embodiment illustrated in FIG. 4 for a 90 degree rotation would be 1B, 1A, 3B, 3A, 2B, 2A, 1B, 1A, in order to read out data for the first video line, namely, pixels 3'-0, 3-0, 2'-0, 2-0, 1'-0, 1-0, 0'-0 and 0-0. During a 90 degree rotation read, the memory devices within each bank are enabled with the bank enable lines EN1, EN2 and EN3, so that data is simultaneously retrieved from both memory devices of each memory bank and supplied to the output buffer-latch unit 24. As is illustrated in FIG. 4, however, offset addresses must be supplied to each of the memory banks by the addressing units 28-32. For example, while pixels 3'-0 and 3-0 are located in the last row of memory devices 1A and 1B, pixels 2'-0 and 2-0 are located in the third row of memory devices 3A and 3B, and pixels 1'-0 and 1-0 are located in the second row of memory devices 2A and 2B. FIGS. 5 and 6 respectively illustrate the required addressing scheme for the illustrated example for both a positive 90 degree and negative 90 degree rotation. The memory controller 34 selectively enables the output latches 80-90 to output the pixel data in the correct sequence.

Read out of the stored image data to produce a normally oriented image is accomplished in the same manner as the writing of data to the framestore, namely, the memory devices are sequentially addressed and the output latches 80-90 are enabled by memory controller 34 to properly control the order of the pixel data output. For example, the output latches corresponding to the first memory devices (1A, 2A, 3A) are sequentially enabled when read out of the first row (0) of image data is desired. When row 1 is read out, however, the enabling of the output latches must start with output latch 26, as the first pixel for row 1 is stored in memory device 2A. The bank enable lines are also used to enable the memory devices during a normal orientation read operation. The above-described framestore architecture insures that data representative of two consecutive pixels is not required to be read from the same memory device, thereby permitting real-time operation when retrieving data in a rotated format.

While the illustrated example used the storage of a eight line by twelve pixel digital image as an illustration, it will be readily appreciated by those of ordinary skill in the art that the number and size of the memory devices employed can be varied to suit any particular application. For example, subjective quality tests indicate that 720 horizontal luminance samples and 360 of each chroma signal per line gives very good results when reproducing color digital images. Employing the NTSC standard of 480 lines, a total of 367 K pixels of information must be stored for the luminance signal and 184 K pixels of information must be stored for each chroma signal for a single digital image. The framestore illustrated in FIG. 4 can store the luminance signal information utilizing 64 K×4 RAMs or 256×4 RAMs for the memory devices. Additional data memory banks can also be added to store the chroma signal information.

The framestore architecture can be employed in any type of digital imaging application where it is desirable to rotate digital image data. It is particularly useful, however, in the application of a still video camera or a video player device for reproducing images from a still video camera in order to correctly display the image on a video monitor. While the invention has been described with reference to certain preferred embodiments thereof, however, it will be readily appreciated that modifications, variations, and other applications of the invention are possible within the scope of the appended claims.

What is claimed:

1. An apparatus comprising:
   input means for latching input pixel data in a predetermined sequence;
   storage means, including a plurality of storage devices, coupled to the input means for storing the input pixel data latched by the input means, wherein the storage devices are arranged in a plurality of memory banks with each memory bank comprising at least one even field memory device and one odd field memory device and wherein a common bank enable line is coupled to each of the memory devices within a memory bank, an even field enable line is coupled to the even field memory devices in each of the memory banks, and an odd field enable line is coupled to the odd field memory devices in each of the memory banks;
   output means coupled to the storage means for retrieving the pixel data stored in the storage means and generating an output pixel data stream in accordance with a predetermined sequence;
   addressing means coupled to the storage means for addressing the storage devices; and
   control means for controlling the operation of the input means, the storage means, the output means and the addressing means in a write operation mode and a read operation mode, including the activation of the common bank enable lines, the even field enable line and the odd field enable line, wherein the input pixel data is stored in the storage devices in the write operation mode such that consecutive pixel data retrieved during the read operation mode is not stored in the same storage device.

2. An apparatus as claimed in claim 1, wherein the input means includes an input latch unit including a plurality of input latches and an input buffer-latch unit including a plurality of buffer-latches corresponding to the plurality of input latches.

3. An apparatus as claimed in claim 1, wherein said output means includes an output buffer-latch unit including a plurality of buffer-latches and an output latch unit including a plurality of output latches corresponds to the buffers.

4. An apparatus as claimed in claim 2, wherein the control means sequentially enables said input latches starting with the input latch (n) that corresponds to a given row (n) of input pixel data.

5. A method of rotating a digital image comprising:
   latching input pixel data representative of the digital image in a predetermined sequence with a latch unit;
   storing the input pixel data latched by the input unit in a storage unit having a plurality of storage devices in a write operation mode, wherein the storage devices are arranged in a plurality of memory banks with each memory bank comprising at least one even field memory device and one odd field memory device and wherein a common bank enable line is coupled to each of the memory devices within a memory bank, an even field enable line is coupled to the even field memory devices in each of the memory banks, and an odd field enable line is coupled to the odd field memory devices in each of the memory banks;
   retrieving the pixel data stored in the storage unit with an output unit in a read operation mode; and
   generating a rotated output pixel data stream in accordance with a predetermined sequence;
   wherein the input pixel data is stored in the storage devices in the write operation mode by the activation of the common bank enable lines, the even field enable line and the odd field enable line such that consecutive pixel data retrieved during the read operation mode is not stored in the same storage device.

* * * * *